July 21, 1964     M. HABER     3,141,684
COMBINED CHECKBOOK AND CASHBOOK
Filed April 25, 1962     2 Sheets-Sheet 1
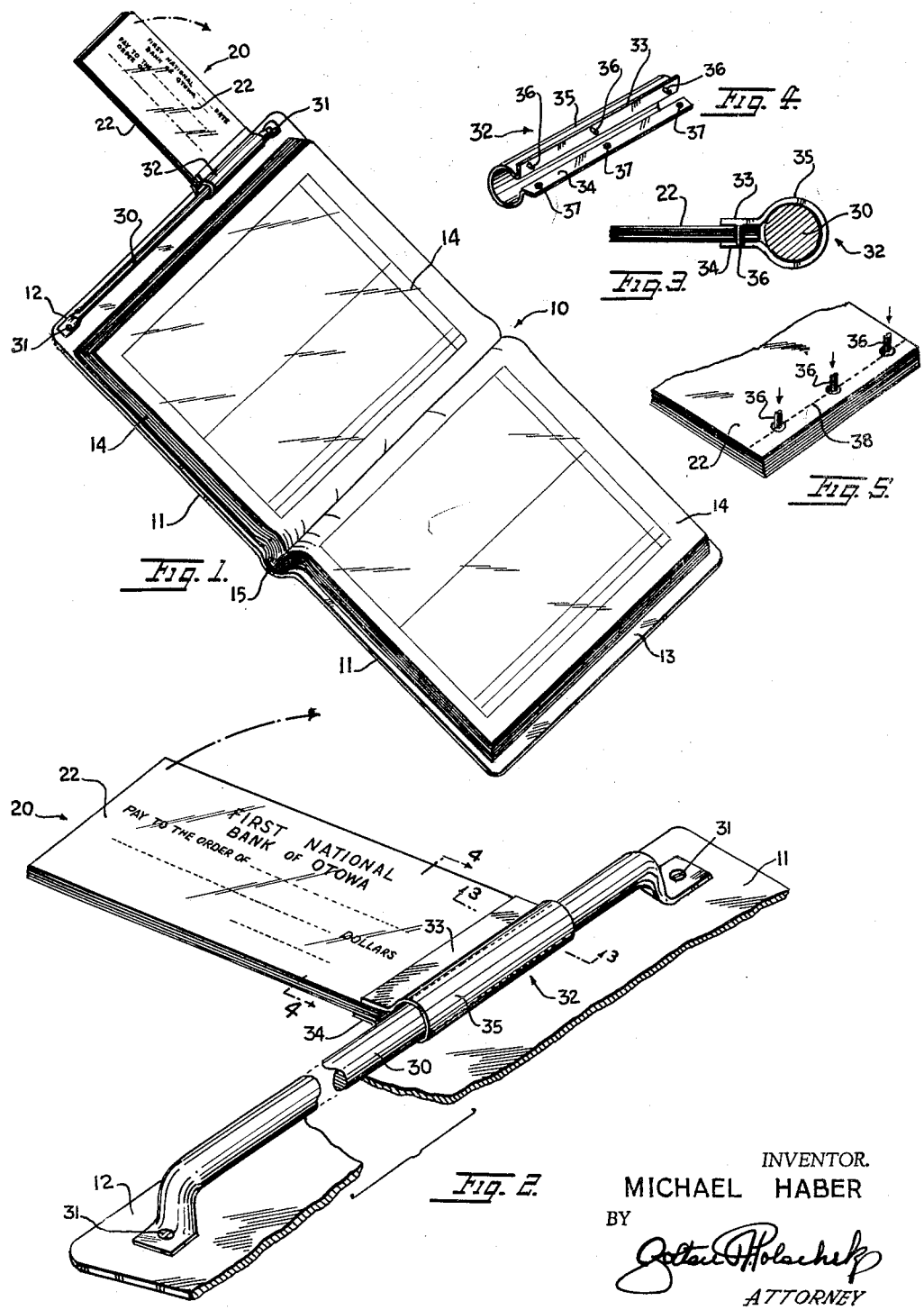
INVENTOR.
MICHAEL HABER
BY
ATTORNEY

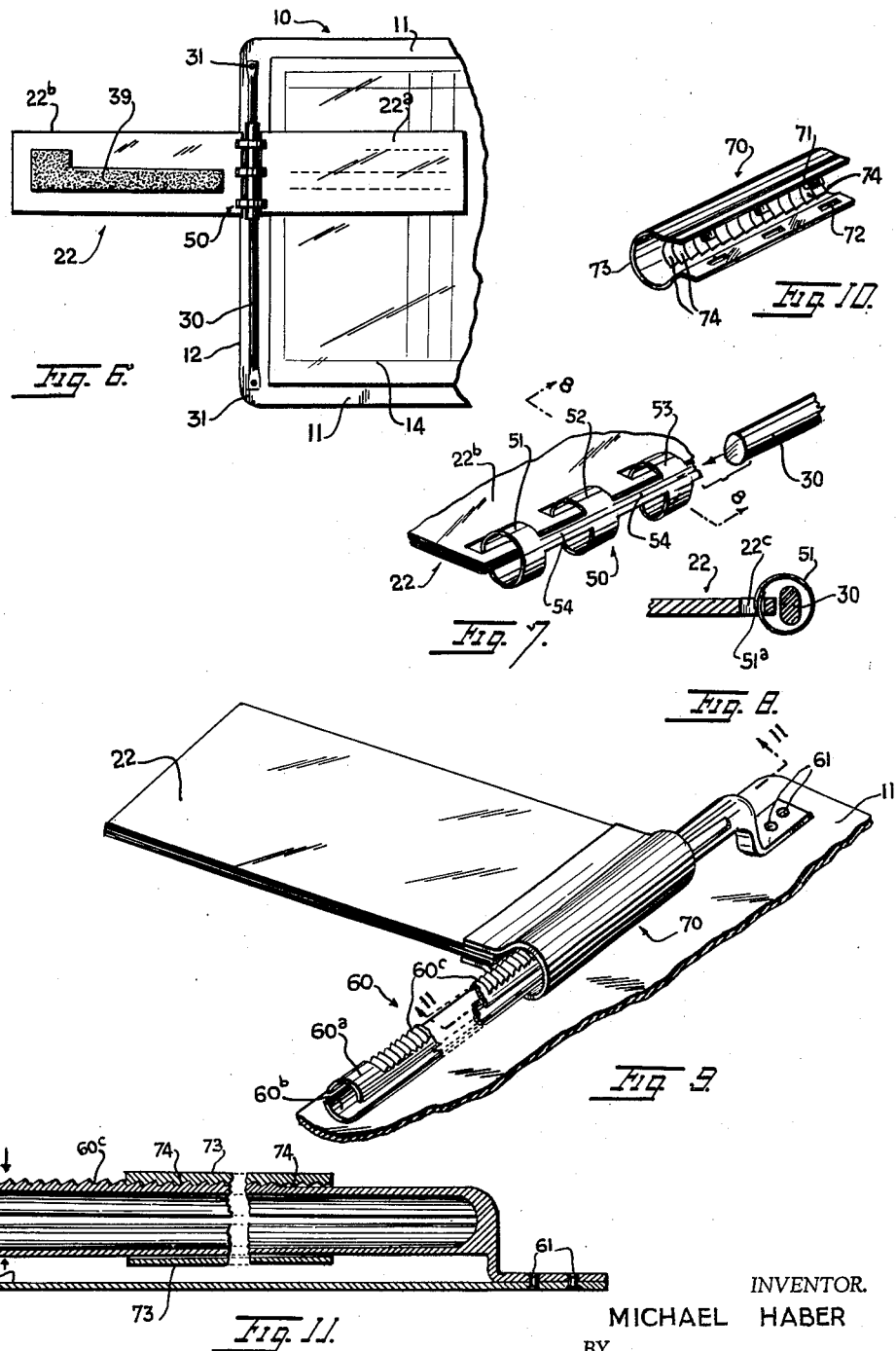

United States Patent Office 3,141,684
Patented July 21, 1964

3,141,684
COMBINED CHECKBOOK AND CASHBOOK
Michael Haber, 105—34 63rd Ave., Forest Hills, N.Y.
Filed Apr. 25, 1962, Ser. No. 190,055
2 Claims. (Cl. 282—8)

This invention pertains to record books generally, and in particular to a record book which is so arranged and constructed as to permit a variety of accounting transactions to be entered easily. Moreover, with the record book provided by this invention there is eliminated the need for making many subsequent entries of the same accounting transaction in other record-keeping books.

In accordance with one embodiment of the invention a checkbook is combined with a cashbook. Currently, when a check is made out, the same information appearing on the face of the check is entered on the stub attached to the check. Repetitiously, the information on the check stub is againt entered in a columnar-ruled cashbook according to the appropriate accounting nature of the transaction for which the check is issued. For every check issued, the same repetitious reentries are required to be made. From time to time, the accumulated check stubs are totalled for the purpose of determining the business' cash balance. Similarly, the cashbook entries are totalled. All of these repetitious entries, from the face of the check, to the check stub, to the cashbook, creates a relatively high probability for error. Moreover, such repetitious work is inefficient.

By providing, according to the invention, a combined checkbook and cashbook, the following objects, among others, are achieved: there would be no need to make entries on check stubs; such entries may be easily entered in the cashbook. Only one totalling is required to be done—in the cashbook.

Briefly, according to one embodiment of the invention, there is combined with a record book (for example, a cashbook) a checkbook. Near the edge of the inner cover surface there is fastened an elongated rail, which extends the length of the record book's cover. Coupled with the rail and slidable therealong is a clip-like member including mating pins and apertures; the mating pins being adaptable for receiving end-apertured checks. The clip-like member frictionally holds the checks at any position to which they are slidably moved along the rail. Functionally, as the record book is closed the checks are rotatably turned so that they are between pages of the record book. As the record book is opened, the checks are rotatably turned outwardly from the pages so that they can rest in a plane parallel with the plane of the opened book. In use, the checks are slid along the rail to the proper position, adjacent blank spaces on the face of the record book's pages so that the check can be written; and, immediately, the information can be entered in the adjacent blank space on the record page. For the next check writing and record book entry, the checks are slidably moved along the rail and held in position, by the friction of the clip-like member, near the next appropriate blank space on the record book's page.

In accordance with one modification of the invention, there is provided a carbon-backing for each check so that each check may be rotatably turned over on the face of a page of the record book. Thus, as the check is written, there is simultaneously made on the page of the record book a carbon-copy entry. Beneficially, only one entering operation is performed by the bookkeeper.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a combined checkbook and cashbook provided by the invention.

FIG. 2 is an enlarged perspective view, partially in section, of the slide rail and clip used in the combination illustrated in FIG. 1.

FIG. 3 is a cross-sectional view taken along the lines 3—3 of FIG. 2.

FIG. 4 is a perspective view of the sliding clip used in the invention, as viewed along the lines 4—4 of FIG. 2, the clip being illustrated as tensionably spread apart and without a stack of checks.

FIG. 5 is a perspective view of a stack of checks showing end apertures in the checks for receiving retaining pins of the clip illustrated in FIG. 4.

FIG. 6 is a partial plan view of a modification of the combined checkbook and cashbook of the invention.

FIG. 7 is a perspective view of the modified clip and rail of the invention illustrated in FIG. 6.

FIG. 8 is a cross-sectional view of the clip shown in FIG. 7, taken along the lines 8—8 of FIG. 7.

FIG. 9 is a perspective view of a modified rail and clip of the invention.

FIG. 10 is a perspective view of the modified clip used in the combination illustrated in FIG. 9; the modified clip being tensionably spread apart to permit clearer viewing. Also, for purposes of clarity, the stack of checks ordinarily held by the clip is not shown.

FIG. 11 is a sectional view of the rail and clip of FIG. 9 viewed along the lines 11—11 of FIG. 9.

As is illustrated in FIG. 1, there is an opened cashbook designated generally by the reference numeral 10. Attached to a slide rail 30 fastened on the inside cover surface 12 of the cashbook, is a checkbook, the checkbook being designated generally by the reference numeral 20. The means by which the checkbook 20 is fastened for sliding movement on the rail 30 is described hereinafter.

The cashbook 10 is a conventional record-keeping book used by bookkeepers and accountants. Two covers 11 of relatively hard material are used to contain a stack of pages 14; a flexible binding portion 15 provides a backing which allows the cashbook to be opened and closed. A relatively stiff cardboard covered with fabric or leather is a suitable construction for the covers 11. Of course, the binding portion 15 is the softer, more flexible, covering material, for example, fabric, leather, plastic, etc.

As may be appreciated from FIG. 1, the checkbook 20 is a stack of blank checks 22. As is suggested by the dotted arrows in FIG. 1, the checkbook 20 can be rotated about the longitudinal axis of the slide rail 30 whereby the checkbook can be nested between the pages 14 when the cashbook 10 is closed.

Referring now to FIGS. 1 and 2, the slide rail 30 has apertures at both of its extremities for receiving rivets 31. The two rivets 31 are inserted through the apertures in the slide rail 30 and through registering holes (not shown) in the inside cover surface 12 of cover 11 of the cashbook 10. Preferably, the heads of the rivets 31 are countersunk in the ends of the rail 30 and in the hard cover 11 so that the rivet heads may not protrude unnecessarily from the surfaces of the book cover and rail ends.

FIG. 2 illustrates the slide rail 30 in an enlarged and partly sectioned perspective view. As shown, the slide rail 30 is a round bar having its extremities bent and flattended. Suitable materials for forming the rail 30 would be, for example, round metallic or plastic stock which can easily be formed in the shape shown. A brass rod may, for example, have its ends bent, swaged and punched. Encompassing the rail 30 is a slip 32 which is formed of a resilient material, for example, from a thin spring steel.

The construction of the clip 32, and its usefulness, is best described with reference to FIGS. 2, 3 and 4. A hollow cylindrical portion 35 has two laterally extending flange portions 33 and 34 extending therefrom. On the inner surface of the flange portion 34 are the three spaced-apart holes 37 which are purposeful for receiving the three pins 36, on the inner surface of the flange portion 33. FIG. 4, showing the clip 32 with its flange portions 33 and 34 tensionably forced apart, shows the pins 36 and the holes 37 particuarly well. Advantageously, the natural stress inherent in the clip 32 will tend to force the flange portions 33 and 34 into a face-to-face abutment. A preferred material from which the clip 32 may be formed is a spring steel, i.e., the same kind of material as is used for fashioning the familiar spiral-like clock-spring. As can be appreciated from the sectional view illustrated in FIG. 3, and from FIG. 5, apertures through the end portions of the checks 22 receive the pins 36. Accordingly, the stack of checks is firmly held to the clip 32 by the pressure of the flanges 33, 34 and the received pins 36.

As is shown in FIG. 3, the arcuately formed cylindrical portion 35 fits closely around the round slide rail 30. Although closely fitting the rail 30, it may, with but slight manual pressure, be slidably moved along the rail so that the check 22 to be prepared may be lined up next to the appropriate line and space on the left hand, or right hand, page 14. The friction between the surface of the round rail 30 and the inner surface of the cylindrical portion 35 will be adequate to maintain the checks 22 and the clip 32 at the desired location with reference to the page 14.

In addition to being able to slide the checks 22 along the rail 30, it is also possible to rotatably turn the clip 32, and the retained checks 22, about the central axis of the round rail 30. As is stated hereinbefore, this will permit the stack of checks 22 to be nested between the pages 14 when the cashbook 10 is closed.

In accordance with one modification of the present invention, which is illustrated in FIGS. 6 and 7, each check may be provided with a carbon-backing so that as the check 22 is written, a carbon copy impression of pertinent information may be simultaneously recorded on the left-hand page 14, on appropriate spaces on the underlying page. For example, such information as the amount and the payee can be recorded simultaneously.

As is shown in FIG. 6, the back surface 22$^b$ of a check 22 is turned outwardly from the cashbook 10. Actually, there is a stack of checks 22 under the back surface 22$^b$, each check having its back surface facing upwardly. One check, as shown, is resting face up on the surface of the page 14, this check's front surface being designated by the reference numeral 22$^a$. The back surface 22$^b$ of every check has a carbonized surface area 39 adhering thereto. The carbonized surface area is so situated that, with respect to the face or front surface 22$^a$, the spaces in which are entered the following information are carbon-backed: the date on which the check is written; the name of the payee; and the amount, in numbers, for which the check is drawn.

Of course, if an invoice block appears on the face 22$^a$, it too may be carbon-backed on back surface 22$^b$ with a carbonized area 39 in order that further information of an accounting nature may be recorded on page 14, simultaneously. As in the embodiment illustrated in FIGS. 1 and 2, there is provided a rail 30 which is fastened at its apertured flanged ends by rivets 31 to the inner edge portion 12 of the hard cover 11. However, instead of the long cylindrical clip 32 used in the embodiment of FIGS. 1–5, a different arrangement is used; the various features of this different structural arrangement is illustrated in perspective in FIG. 7.

Referring now to FIG. 7, there is illustrated a different type of clip, which is designated generally by the reference numeral 50. As is illustrated, this clip comprises three resilient ring-like members 51, 52 and 53. As in the previous embodiment, spring steel is a suitable material from which the clip 50 may be formed. Integral with the three ring-like members are the two longitudinal rib portions 54 which serve to interconnect the ring-like members 51, 52 and 53. The stack of checks 22 is coupled with the clip 50 by means of three slotted apertures 22$^c$ which receive the ring-like members 51, 52 and 53.

In the sectional view of FIG. 8, the ring-like member 51 is clearly shown as a split ring having overlapping circumferential end portions 51$^a$. In the embodiment of the clip 50, shown in FIGS. 6, 7 and 8, the rail 30 has an oval-shaped cross section, instead of a circular-shaped one. Advantageously, as shown in FIG. 8, the inner surfaces of the ring-like members 51, 52 and 53 are frictionally coupled with the oval rail 30 over a relatively large surface area. In addition, the edge of the stack of checks 22, within the circumference of the ring-like members, frictionally bears against the surface of the oval rail 30. As in the embodiment illustrated in FIGS. 1–5, the aforementioned frictional forces serve to frictionally hold the clip 50 and stack of checks 22 at any position on the rail 30, i.e., the positions to which the checks and clip may be slidably moved. Beneficially, with the arrangement illustrated in FIGS. 6, 7 and 8, each check 22 may be individually rotated over on top of a page of the cashbook. FIG. 6 illustrates the result achieved.

In accordance with another embodiment of the invention, illustrated in FIG. 9 in perspective another kind of slide rail 60 is provided. One end, as shown, is flanged and apertured for receiving rivets 61 for fastening the slide rail 60 to the hard cover 11 of the cashbook, the rail 60 being fastened similar to the arrangement shown in FIG. 1. As illustrated, the rail 60 comprises two semi-circular sections 60$^a$ and 60$^b$. As indicated in FIG. 9, both sections 60$^a$ and 60$^b$ are biased by their inherent resilient stresses so as to be angularly offset by the angle $\theta$. More specifically, sections 60$^a$ and 60$^b$ are vertically spread by this angle, i.e., the ends of the sections 60$^a$ and 60$^b$ are further apart at their free ends than at their riveted end. The reason for doing this will become apparent from the description hereinafter appearing.

Also illustrated in FIGS. 9 and 10 is a modified clip which is designated generally by the reference numeral 70. This clip 70 is very much like the clip 32 illustrated in FIG. 4. Clip 70, like the clip 32, has mating pins 71 and apertures 72. However, on the inner surface of its cylindrical section 73, a number of spaced-apart splines 74 are formed therein, see FIG. 10. The clip's internal splines 74 are adapted to mate in locking relationship with the splines 60$^c$ which are formed in the semicircular section 60$^a$ of the rail 60 (FIG. 9).

Advantageously, the clip 70 can be locked at any position by virtue of the mating splines or notches, on the rail 60. In order to slide the clip 70 along the sectioned rail 60, all that the bookkeeper needs to do is to grasp the free ends of the sections 60$^a$ and 60$^b$ and press them together, i.e., so that they form a closed circle in cross section. As a consequence, the diameter of the rail 60 is sufficiently reduced to permit the clip 70 to be freely moved along the rail. Also, the stack of checks 22 may be rotated along the longitudinal axis of the rail 60.

Returning momentarily to the illustration of FIG. 5, the perforated line 38 allows each check 22 to be torn out as it is completed. A similar perforated line (not illustrated) may be used with the modifications shown at FIGS. 6 and 9.

As shown in FIG. 11 in the sectional side view, the splined surface 60$^c$ easily interlocks with the splines 74 within the cylindrical portion 73 of the clip 70. Of course, the semicircular sections 60$^a$ and 60$^b$ will flex apart, and together, to a greater degree at the free end of the rail 60 than at the riveted end. Therefore, near the riveted end the surface of section 60$^a$ does not have splines 60c formed therein. Sufficient interlocking action occurs near the riveted end because the clip 70 is long enough to interlock with a few of the splines 60c next to the smooth surface of section 60a near the riveted end portion of the rail 60.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. In combination, a checkbook and a record book comprising: a record book with pivoted sheets, said book including a longitudinal edge portion along an inside cover surface thereof, a stack of checks; a rail fastened at its extremities along the record book's longitudinal edge portion; clip means holding the stack of checks and disposed around the rail, said clip means being slidable along said rail and being rotatable about the longitudinal axis of the rail, said rail including a pair of spaced-apart members, semicircular in cross section.

2. In combination, a checkbook and a record book comprising: a record book including a longitudinal edge portion along an inside cover surface thereof; a stack of checks; a slide rail including at one extremity thereof an apertured mounting flange adapted for receiving rivet means whereby said rail is cantilever-mounted along the record book's longitudinal edge portion on the inside cover surface thereof, there being a space between the cantilever-mounted rail and said inside cover surface, and clip means coupled with said rail for holding the stack of checks near an edge portion area of said stack of checks, the clip means being adaptable for sliding movement along said cantilevered rail and for rotation about the longitudinal axis of the rail, said cantilevered slide rail comprising two spaced-apart sections, the spaced-apart sections being joined at one end in said mounting flange, one section including splines along the surface thereof, said splines running from the free end of the cantilever to a point near the mounting flange portion, the surface between the flange portion and the splines being smooth-surfaced; and said clip means including splines adaptable for interlocking with the splines on said cantilever section whereby the clip means can be locked in any position along the rail, said clip means being taken out of interlocking relation with said section by manually forcing the rail's spaced-apart sections together.

References Cited in the file of this patent

UNITED STATES PATENTS

| | | |
|---|---|---|
| 965,227 | Robinson | July 26, 1910 |
| 2,163,193 | Critchfield | June 20, 1939 |
| 2,722,436 | Pfeiffer | Nov. 1, 1955 |
| 2,734,756 | Selinker et al. | Feb. 14, 1956 |

FOREIGN PATENTS

| | | |
|---|---|---|
| 406,382 | Great Britain | Mar. 1, 1934 |
| 603,871 | France | Jan. 14, 1926 |